US012606181B2

(12) United States Patent
Wu et al.

(10) Patent No.: US 12,606,181 B2
(45) Date of Patent: Apr. 21, 2026

(54) METHOD AND APPARATUS FOR PREDICTING AVERAGE ENERGY CONSUMPTION OF AN ELECTRIC VEHICLE

(71) Applicant: GREAT WALL MOTOR COMPANY LIMITED, Baoding (CN)

(72) Inventors: Maiqing Wu, Baoding (CN); Gang Yan, Baoding (CN); Xu Shi, Baoding (CN); Xuejing Li, Baoding (CN); Dandan Song, Baoding (CN); Shengbo Wang, Baoding (CN); Nan Zhang, Baoding (CN); Chunmei Zhang, Baoding (CN)

(73) Assignee: Great Wall Motor Company Limited, Baoding (CN)

( * ) Notice: Subject to any disclaimer, the term of this patent is extended or adjusted under 35 U.S.C. 154(b) by 542 days.

(21) Appl. No.: 18/013,762

(22) PCT Filed: Jan. 13, 2022

(86) PCT No.: PCT/CN2022/071701
§ 371 (c)(1),
(2) Date: Dec. 14, 2023

(87) PCT Pub. No.: WO2022/156583
PCT Pub. Date: Jul. 28, 2022

(65) Prior Publication Data
US 2024/0239353 A1      Jul. 18, 2024

(30) Foreign Application Priority Data
Jan. 19, 2021    (CN) ......................... 202110067943.6

(51) Int. Cl.
*B60W 40/12*        (2012.01)
*B60L 3/12*        (2006.01)
(Continued)

(52) U.S. Cl.
CPC ............... *B60W 40/12* (2013.01); *B60L 3/12* (2013.01); *B60L 58/12* (2019.02);
(Continued)

(58) Field of Classification Search
CPC ............. B60W 40/12; B60W 50/0097; B60W 2050/0025; B60W 2050/0044;
(Continued)

(56) References Cited

U.S. PATENT DOCUMENTS 10,571,287 B2 *  2/2020  Moore ..................... B60L 50/50
11,814,032 B2 *  11/2023  Poll .......................... B60L 50/60
(Continued)

FOREIGN PATENT DOCUMENTS

CN          104340074 A      2/2015
CN          108790860 A      11/2018
(Continued)

OTHER PUBLICATIONS

Supplementary European Search Report for application No. EP 22 74 2062 issued on Dec. 13, 2023 (10 pages).

*Primary Examiner* — Sze-Hon Kong
(74) *Attorney, Agent, or Firm* — Boyle Fredrickson, S.C.

(57)          ABSTRACT

The embodiments of the present application provide a method and an apparatus for predicting an average energy consumption of an electric vehicle. The method comprises: according to a real-time voltage and a real-time current of a battery pack of an electric vehicle, determining an actual energy consumption of the electric vehicle in the traveled mileage segment corresponding to the current time, the traveled mileage segment comprising a plurality of unit mileage segments; according to the actual energy consumption of each unit mileage segment of the traveled mileage segment, determining an initial average energy consumption of the electric vehicle at the current time; acquiring a target
(Continued)

average energy consumption and average energy consumption adjustment parameters of the electric vehicle; and according to the initial average energy consumption, the target average energy consumption and the average energy consumption adjustment parameters, determining the actual average energy consumption of the electric vehicle at the current time. The present application can accurately calculate the actual average energy consumption of the electric vehicle at the current time in real time.

19 Claims, 2 Drawing Sheets

(51) Int. Cl.
      *B60L 58/12*           (2019.01)
      *B60W 50/00*           (2006.01)
(52) U.S. Cl.
      CPC ....  *B60W 50/0097* (2013.01); *B60L 2240/547*
            (2013.01); *B60L 2240/549* (2013.01); *B60L*
                  *2260/54* (2013.01); *B60W 2050/0025*
            (2013.01); *B60W 2050/0044* (2013.01); *B60W*
                                    *2530/18* (2013.01)
(58) Field of Classification Search
      CPC ....... B60W 2530/18; B60W 2050/002; B60W
                  2510/242; B60W 50/045; B60W 40/00;
                  B60L 3/12; B60L 58/12; B60L 2240/547;
                  B60L 2240/549; B60L 2260/54; B60L
                                    58/10; Y02T 10/70
      See application file for complete search history.

(56)                    References Cited

U.S. PATENT DOCUMENTS

2011/0160990  A1*   6/2011   Mineta ............... G01C 21/3469
                                                            701/123
2012/0176231  A1*   7/2012   Skaff ...................... B60K 35/22
                                                            340/439
2012/0179395  A1*   7/2012   Gilman ................... B60L 58/12
                                                            702/61
2013/0110331  A1*   5/2013   Kinser .................... B60L 53/62
                                                            180/65.21
2013/0158758  A1*   6/2013   Kim ........................ G07C 5/004
                                                            701/123
2013/0253740  A1*   9/2013   Kim ........................ B60L 58/12
                                                            701/123
2016/0001658  A1*   1/2016   Meyer ................... G07C 5/0816
                                                            903/903
2016/0061610  A1*   3/2016   Meyer .................... B60L 58/12
                                                            701/22
2019/0063937  A1*   2/2019   Moore ................... B60L 50/50
2019/0344775  A1*  11/2019   Ourabah ........... B60W 50/0097
2020/0271470  A1*   8/2020   Symanow ............ B60W 20/12
2022/0176939  A1*   6/2022   Poll ...................... B60W 10/26
2023/0160720  A1*   5/2023   Iida ........................ B60L 15/20
                                                            701/532

FOREIGN PATENT DOCUMENTS

CN            108819722  A       11/2018
CN            109532555  A        3/2019
CN            111376790  A        7/2020
CN            112810614  A        5/2021
JP           2013126368  A        6/2013
JP           2016049922  A        4/2016

* cited by examiner

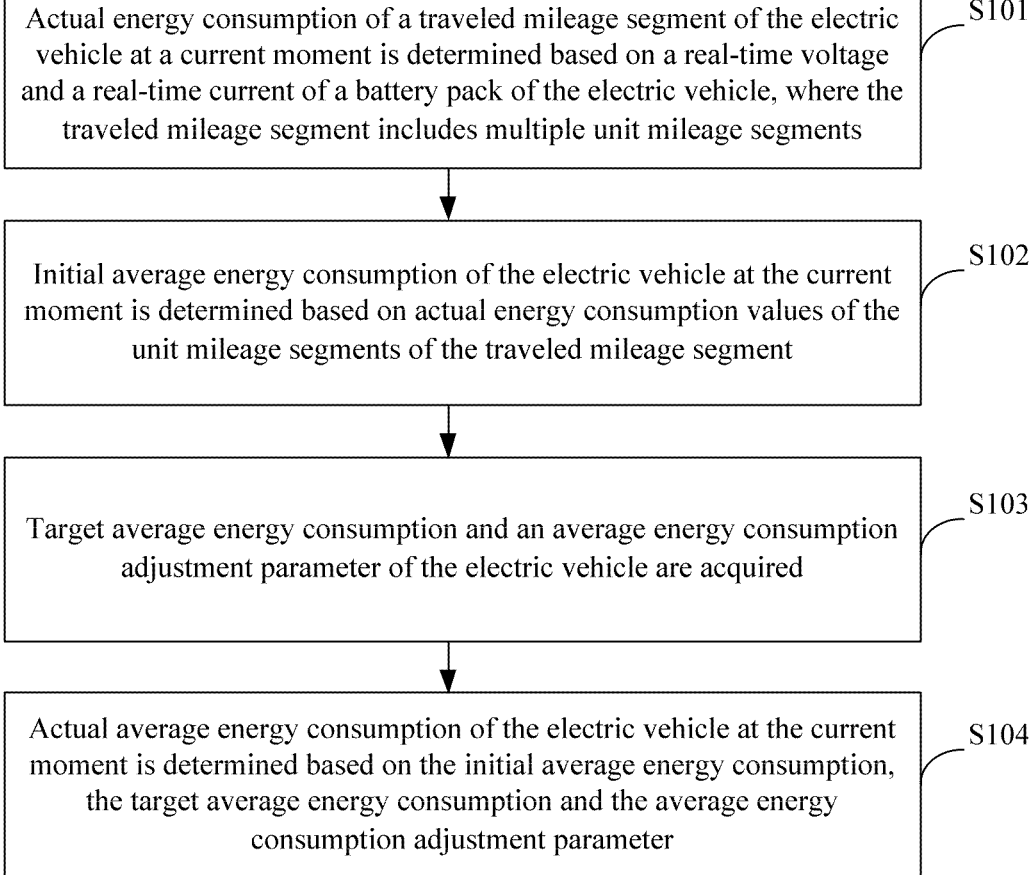

Actual energy consumption of a traveled mileage segment of the electric vehicle at a current moment is determined based on a real-time voltage and a real-time current of a battery pack of the electric vehicle, where the traveled mileage segment includes multiple unit mileage segments — S101

Initial average energy consumption of the electric vehicle at the current moment is determined based on actual energy consumption values of the unit mileage segments of the traveled mileage segment — S102

Target average energy consumption and an average energy consumption adjustment parameter of the electric vehicle are acquired — S103

Actual average energy consumption of the electric vehicle at the current moment is determined based on the initial average energy consumption, the target average energy consumption and the average energy consumption adjustment parameter — S104

Figure 1

METHOD AND APPARATUS FOR PREDICTING AVERAGE ENERGY CONSUMPTION OF AN ELECTRIC VEHICLE

The present disclosure a national stage of International Application No. PCT/CN2022/071701, filed on Jan. 13, 2022, which claims the priority to Chinese Patent Application No. 202110067943.6, titled "METHOD AND APPARATUS FOR PREDICTING AVERAGE ENERGY CONSUMPTION OF ELECTRIC VEHICLE", filed on Jan. 19, 2021 with the China National Intellectual Property Administration, both of which are incorporated herein by reference in their entireties.

TECHNICAL FIELD

The present disclosure relates to the technical field of electric vehicles, and in particular to a method for predicting average energy consumption of an electric vehicle and an apparatus for predicting average energy consumption of an electric vehicle.

BACKGROUND OF THE INVENTION

Real-time display of energy consumption of an electric vehicle can not only allow a user to more intuitively feel the energy consumption of the electric vehicle per 100 kilometers, but also provide the user with a guarantee in a usage process of the vehicle. At present, the energy consumption of the electric vehicle is usually calculated based on total discharge power and total mileage of an entire power-on cycle working condition. The calculated energy consumption does not take into account a driving habit of a driver or a real-time working condition in a driving process. However, in practice, the driving habit of the driver or the real-time working condition has an impact on the energy consumption. Therefore, with the current energy consumption calculation method, real-time energy consumption of the electric vehicle cannot be accurately calculated.

SUMMARY OF THE INVENTION

According to the present disclosure, a method and an apparatus for predicting average energy consumption of an electric vehicle are provided, to solve the existing problem that the real-time energy consumption cannot be accurately calculated.

In a first aspect of the present disclosure, a method for predicting average energy consumption of an electric vehicle is provided. The method includes:

determining actual energy consumption of a traveled mileage segment of the electric vehicle at a current moment based on a real-time voltage and a real-time current of a battery pack of the electric vehicle, where the traveled mileage segment includes multiple unit mileage segments;

determining initial average energy consumption of the electric vehicle at the current moment based on actual energy consumption values of the unit mileage segments of the traveled mileage segment;

acquiring target average energy consumption and an average energy consumption adjustment parameter of the electric vehicle; and determining actual average energy consumption of the electric vehicle at the current moment based on the initial average energy consumption, the target average energy consumption and the average energy consumption adjustment parameter.

In some embodiments, the determining initial average energy consumption of the electric vehicle at the current moment based on actual energy consumption values of the unit mileage segments of the traveled mileage segment includes:

acquiring weights corresponding to the actual energy consumption values of the unit mileage segments; and performing a weighted average on the actual energy consumption values of the unit mileage segments based on the weights corresponding to the actual energy consumption values of the unit mileage segments, and determining a result of the weighted average as the initial average energy consumption of the electric vehicle at the current moment, where the weights corresponding to the actual energy consumption values of the unit mileage segments decrease as distances between the unit mileage segments and mileage of the electric vehicle at the current moment decrease.

In some embodiments, the determining actual average energy consumption of the electric vehicle at the current moment based on the initial average energy consumption, the target average energy consumption and the average energy consumption adjustment parameter includes:

adjusting the initial average energy consumption based on the average energy consumption adjustment parameter and determining the adjusted initial average energy consumption as the actual average energy consumption of the electric vehicle at the current moment, in a case that an absolute value of a difference between the initial average energy consumption and the target average energy consumption is greater than or equal to a first threshold; and determining the target average energy consumption as the actual average energy consumption of the electric vehicle at the current moment, in a case that the absolute value of the difference between the initial average energy consumption and the target average energy consumption is smaller than the first threshold.

In some embodiments, the adjusting the initial average energy consumption based on the average energy consumption adjustment parameter includes:

determining a difference between the initial average energy consumption and the average energy consumption adjustment parameter as the adjusted initial average energy consumption, in a case that the initial average energy consumption is greater than the target average energy consumption; and determining a sum of the initial average energy consumption and the average energy consumption adjustment parameter as the adjusted initial average energy consumption, in a case that the initial average energy consumption is not greater than the target average energy consumption.

In some embodiments, the target average energy consumption is determined by:

acquiring total energy of the battery pack and maximum mileage corresponding to the battery pack; and determining the target average energy consumption based on a ratio of the total energy to the maximum mileage.

In some embodiments, after the determining actual average energy consumption of the electric vehicle at the current moment based on the initial average energy consumption, the target average energy consumption and the average energy consumption adjustment parameter, the method further includes:

acquiring remaining energy of the battery pack;

determining first energy corresponding to current unit energy consumption of the battery pack based on the initial average energy consumption, the target average energy consumption, the average energy consumption adjustment parameter and the remaining energy; and determining second energy corresponding to target unit energy consumption of the battery pack based on the target average energy consumption and the remaining energy; and determining initial average energy consumption of the electric vehicle at a next moment based on the first energy and the second energy.

In some embodiments, the determining initial average energy consumption of the electric vehicle at a next moment based on the first energy and the second energy includes:

determining the actual average energy consumption of the electric vehicle at the current moment as the initial average energy consumption of the electric vehicle at the next moment, in a case that an absolute value of a difference between the first energy and the second energy is greater than or equal to a second threshold.

In some embodiments, the determining first energy corresponding to current unit energy consumption of the battery pack based on the initial average energy consumption, the target average energy consumption, the average energy consumption adjustment parameter and the remaining energy includes:

determining consumed energy of the battery pack based on the remaining energy;

determining an energy consumption difference between the initial average energy consumption and the target average energy consumption; and determining the first energy corresponding to the current unit energy consumption of the battery pack based on a ratio of the consumed energy to a sum of the energy consumption difference and the average energy consumption adjustment parameter.

In some embodiments, the determining second energy corresponding to target unit energy consumption of the battery pack based on the target average energy consumption and the remaining energy includes:

determining the second energy corresponding to the target unit energy consumption of the battery pack based on a ratio of the remaining energy to the target average energy consumption.

In a second aspect of the present disclosure, an apparatus for predicting average energy consumption of an electric vehicle is provided. The apparatus includes a first energy consumption calculation module, a second energy consumption calculation module, a data acquisition module, and a third energy consumption calculation module.

The first energy consumption calculation module is configured to determine actual energy consumption of a traveled mileage segment of the electric vehicle at a current moment based on a real-time voltage and a real-time current of a battery pack of the electric vehicle, where the traveled mileage segment includes multiple unit mileage segments.

The second energy consumption calculation module is configured to determine initial average energy consumption of the electric vehicle at the current moment based on actual energy consumption values of the unit mileage segments of the traveled mileage segment.

The data acquisition module is configured to acquire target average energy consumption and an average energy consumption adjustment parameter of the electric vehicle.

The third energy consumption calculation module is configured to determine actual average energy consumption of the electric vehicle at the current moment based on the initial average energy consumption, the target average energy consumption and the average energy consumption adjustment parameter.

In some embodiments, the second energy consumption calculation module includes a first acquisition sub-module and a first calculation sub-module.

The first acquisition sub-module is configured to acquire weights corresponding to the actual energy consumption values of the unit mileage segments.

The first calculation sub-module is configured to perform a weighted average on the actual energy consumption values of the unit mileage segments based on the weight corresponding to the actual energy consumption values of the unit mileage segments, and determine a result of the weighted average as the initial average energy consumption of the electric vehicle at the current moment.

The weights corresponding to the actual energy consumption values of the unit mileage segments decreases as a distance between the unit mileage segments and mileage of the electric vehicle at the current moment decreases.

In some embodiments, the third energy consumption calculation module includes a second calculation sub-module and a third calculation sub-module.

The second calculation sub-module is configured to adjust the initial average energy consumption based on the average energy consumption adjustment parameter and determine the adjusted initial average energy consumption as the actual average energy consumption of the electric vehicle at the current moment, in a case that an absolute value of a difference between the initial average energy consumption and the target average energy consumption is greater than or equal to a first threshold.

The third calculation sub-module is configured to determine the target average energy consumption as the actual average energy consumption of the electric vehicle at the current moment, in a case that the absolute value of the difference between the initial average energy consumption and the target average energy consumption is smaller than the first threshold.

In some embodiments, the second calculation sub-module includes a first calculation unit and a second calculation unit.

The first calculation unit is configured to determine a difference between the initial average energy consumption and the average energy consumption adjustment parameter as the adjusted initial average energy consumption, in a case that the initial average energy consumption is greater than the target average energy consumption.

The second calculation unit is configured to determine a sum of the initial average energy consumption and the average energy consumption adjustment parameter as the adjusted initial average energy consumption, in a case that the initial average energy consumption is not greater than the target average energy consumption.

In some embodiments, the apparatus further includes a first determination module configured to determine the target average energy consumption. The first determination module includes a second acquisition sub-module and a first determination sub-module.

The second acquisition sub-module is configured to acquire total energy of the battery pack and maximum mileage corresponding to the battery pack.

The first determination sub-module is configured to determine the target average energy consumption based on a ratio of the total energy to the maximum mileage.

In some embodiments, the apparatus further includes a first acquisition module, a second determination module, and a third determination module.

The first acquisition module is configured to acquire remaining energy of the battery pack, after the actual average energy consumption of the electric vehicle at the current moment is determined based on the initial average energy consumption, the target average energy consumption and the average energy consumption adjustment parameter.

The second determination module is configured to determine first energy corresponding to current unit energy consumption of the battery pack based on the initial average energy consumption, the target average energy consumption, the average energy consumption adjustment parameter and the remaining energy; and determine second energy corresponding to target unit energy consumption of the battery pack based on the target average energy consumption and the remaining energy.

The third determination module is configured to determine initial average energy consumption of the electric vehicle at a next moment based on the first energy and the second energy.

In some embodiments, the third determination module is specifically configured to determine the actual average energy consumption of the electric vehicle at the current moment as the initial average energy consumption of the electric vehicle at the next moment, in a case that an absolute value of a difference between the first energy and the second energy is greater than or equal to a second threshold.

In some embodiments, the second determination module includes a second determination sub-module, a third determination sub-module, and a fourth determination sub-module.

The second determination sub-module is configured to determine consumed energy of the battery pack based on the remaining energy.

The third determination sub-module is configured to determine an energy consumption difference between the initial average energy consumption and the target average energy consumption.

The fourth determination sub-module is configured to determine the first energy corresponding to the current unit energy consumption of the battery pack based on a ratio of the consumed energy to a sum of the energy consumption difference and the average energy consumption adjustment parameter.

In some embodiments, the second determination module includes a fifth determination sub-module.

The fifth determination sub-module is configured to determine the second energy corresponding to the target unit energy consumption of the battery pack based on a ratio of the remaining energy to the target average energy consumption.

In the above technical solution according to the present disclosure, the actual energy consumption of the real-time unit mileage segment of the electric vehicle is determined by acquiring the real-time voltage and the real-time current of the battery pack, and the actual average energy consumption of the electric vehicle is determined based on the actual energy consumption values of the unit mileage segments, the target average energy consumption and the average energy consumption adjustment parameter, so that the actual average energy consumption of the electric vehicle at the current moment can be calculated in real time and accurately.

Other features and advantages of the embodiments of the present disclosure will be described in detail in the following embodiments.

BRIEF DESCRIPTION OF THE DRAWINGS

The drawings described herein are intended to provide a further understanding of the embodiments of the present disclosure, and constitute a part of the specification. The drawings and the following embodiments are intended to explain the embodiments of the present disclosure, and are not intended to limit the embodiments of the present disclosure. In the drawings:

FIG. 1 is a flowchart of a method for predicting average energy consumption of an electric vehicle according to a preferred embodiment of the present disclosure;

DETAILED DESCRIPTION OF THE PREFERRED EMBODIMENTS

The embodiments of the present disclosure are described below in detail in conjunction with the drawings. It should be understood that the embodiments described herein are intended to illustrate and explain the present disclosure rather than to limit the present disclosure.

Figure 2:
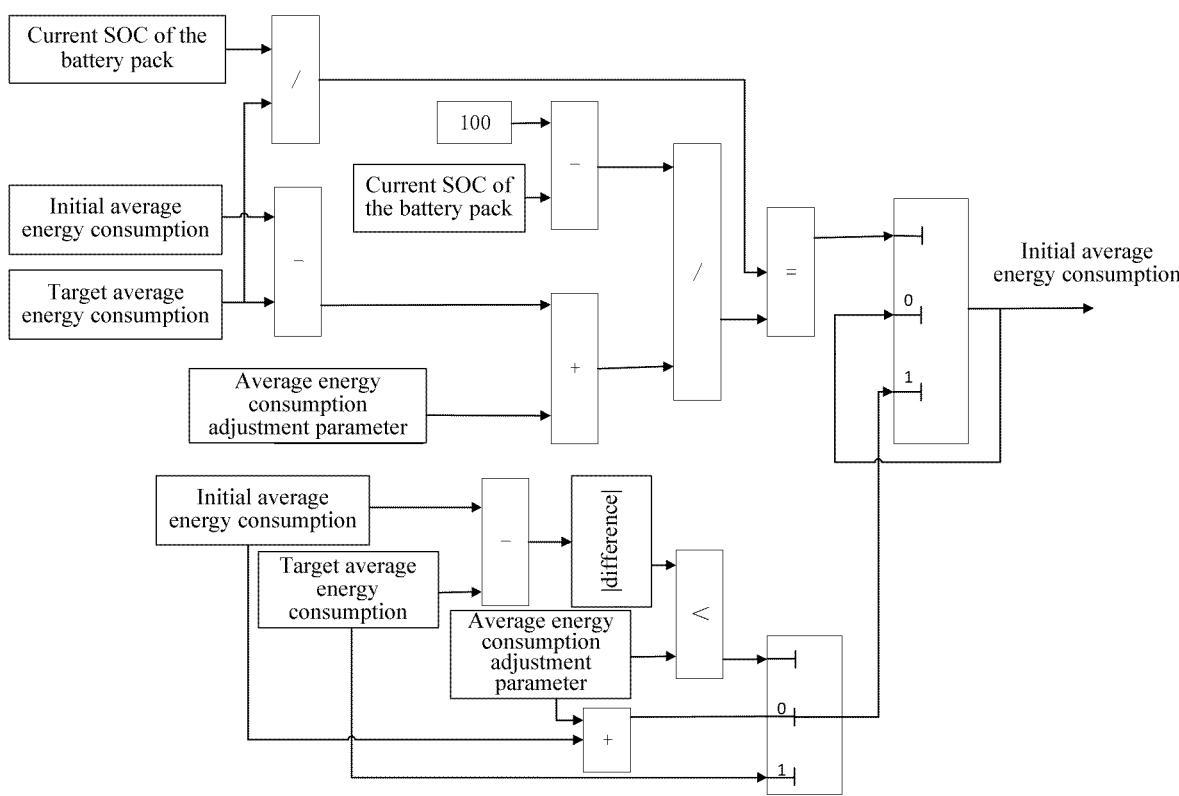
FIG. 2 is a calculation logic diagram of initial average energy consumption according to a preferred embodiment of the present disclosure.

As shown in FIG. 1 and FIG. 2, a method for predicting average energy consumption of an electric vehicle is provided according to an embodiment of the present disclosure. The method may include the following steps S101 to S104.

In S101, actual energy consumption of a traveled mileage segment of the electric vehicle at a current moment is determined based on a real-time voltage and a real-time current of a battery pack of the electric vehicle, where the traveled mileage segment includes multiple unit mileage segments. In S102, initial average energy consumption of the electric vehicle at the current moment is determined based on actual energy consumption values of unit mileage segments of the traveled mileage segment. In S103, target average energy consumption and an average energy consumption adjustment parameter of the electric vehicle are acquired. In S104, actual average energy consumption of the electric vehicle at the current moment is determined based on the initial average energy consumption, the target average energy consumption and the average energy consumption adjustment parameter.

In this way, the actual energy consumption of the real-time unit mileage segment of the electric vehicle is determined by acquiring the real-time voltage and the real-time current of the battery pack, and the actual average energy consumption of the electric vehicle is determined based on the actual energy consumption values of the unit mileage segments, the target average energy consumption and the average energy consumption adjustment parameter, so that the actual average energy consumption of the electric vehicle at the current moment can be calculated in real time and accurately.

Specifically, at a traveling moment of the electric vehicle, actual energy consumption values of multiple unit mileage segments closest to mileage of the vehicle at a current moment is determined in real time. In this embodiment, there may be 30 unit mileage segments, and a distance of each of the unit mileage segments is determined as 0.5 km by which the vehicle travels. A parking position of the vehicle is determined as a starting point. Upon the vehicle is started, each of the unit mileage segments is determined based on mileage of the vehicle. That is, a traveling distance on which the vehicle travels 0.5 km from the parking position of the vehicle is a first unit mileage segment; a traveling distance on which the vehicle travels 1 km from the parking position of the vehicle, that is, a traveling distance when the vehicle travels 0.5 km from an end point of the first unit mileage segment, is a second unit mileage segment, and so on. When the vehicle is traveling, mileage of the vehicle is acquired in real time, the real-time voltage and the real-time current of the battery pack are acquired in real time at the same time. The actual energy consumption value of each unit mileage is obtained by performing integration on the real-time voltage and the real-time current of the battery pack from the following equation:

$$\text{Sum}\,E_{Drv} = \frac{\int UIdt}{3600000},$$

where $\text{Sum}_{Drv}$ represents the actual energy consumption value of the unit mileage, in units of kwh; U represents a voltage of the battery pack, in units of v; and I represents a current of the battery pack, in units of A. When the vehicle travels 15 km from the parking position of the vehicle, the actual energy consumption values of the unit mileage segments in the 30 unit mileage segments before the current moment may be obtained. Average energy consumption of the unit mileage segments is calculated from the equation: AvgEn=SumEDrv/unit mileage, and the average energy consumption of the unit mileage segment is determined as initial average energy consumption at the current moment, where AvgEn represents the average energy consumption of the unit mileage segment, in units of kwh/km. It can be understood that when mileage of the vehicle is less than one unit mileage segment at the next moment, initial average energy consumption at the next moment is still determined based on the actual energy consumption values of the 30 unit mileage segments before the current moment. When mileage of the vehicle exceeds one unit mileage segment at a next moment, the second unit mileage segment in the 30 unit mileage segments before the current moment is determined as a new first unit mileage segment, and 30 unit mileage segment closest to mileage of the vehicle at the current moment is re-determined. In this way, the unit mileage segment is updated in real time with the traveling distance of the vehicle, and the actual energy consumption values of the unit mileage segments can effectively reflect an impact of an actual operation condition of the vehicle (such as a driving habit of a current driver and a current road condition) on the energy consumption. Therefore, the initial average energy consumption of the vehicle at the current moment can be more accurately determined. After the initial average energy consumption of the vehicle at the current moment is obtained, target average energy consumption and an average energy consumption adjustment parameter of the electric vehicle are acquired. The target average energy consumption of the electric vehicle is predetermined theoretical average energy consumption of the electric vehicle. The average energy consumption adjustment parameter is a predetermined constant, which is configured to adjust output actual average energy consumption. For example, if a difference between the initial average energy consumption and the target average energy consumption is too large and the initial average energy consumption is less than the target average energy consumption, a sum of the initial average energy consumption and the average energy consumption adjustment parameter is determined as actual average energy consumption of the electric vehicle at the current moment to be output and displayed. It can be understood that when average energy consumption per 100 kilometers is required to be output and displayed, the obtained actual average energy consumption of the electric vehicle at the current moment may be multiplied by 100.

The target average energy consumption of the electric vehicle may be determined in advance by: acquiring total energy of the battery pack and maximum mileage corresponding to the battery pack; and determining the target average energy consumption based on a ratio of the total energy to the maximum mileage. The total energy and the maximum mileage corresponding to the battery pack may be obtained directly from the battery pack in advance.

In order to more accurately calculate the actual average energy consumption of the electric vehicle at the current moment, the initial average energy consumption of the electric vehicle at the current moment is determined based on the actual energy consumption values of the unit mileage segments of the traveled mileage segment, by the following operations.

Weights corresponding to the actual energy consumption values of the unit mileage segments is acquired. Weighted average is performed on the actual energy consumption values of the unit mileage segments based on the weights corresponding to the actual energy consumption values of the unit mileage segments, and a result of the weighted average is determined as the initial average energy consumption of the electric vehicle at the current moment. The weights corresponding to the actual energy consumption values of the unit mileage segments decrease as distances between the unit mileage segments and mileage of the electric vehicle at the current moment decrease.

As one example, a weight of each of the unit mileage segments in the 30 unit mileage segments is pre-calibrated. The weight becomes smaller as the unit mileage segment is farther from an initial position (such as the parking position) of the vehicle. The initial average energy consumption of the electric vehicle at the current moment is calculated from the following equation: AvgE=(a1*AvgE1+a2*AvgE2+ . . . +a29*AvgE29+a30*AvgE30)/30, where AvgE represents initial average energy consumption at the current moment, in units of kwh, a1, a2 . . . a29, a30 are weights corresponding to respective unit mileage segments, and a1+a2 . . . a29+a30=30. In an embodiment, the weights corresponding to the respective unit mileage segments are shown in Table 1. In this way, the weighted average is performed on the unit mileage segments, and the weights corresponding to the unit mileage segments decrease as the distances between the unit mileage segments and the vehicle at the current moment decrease, which can more effectively reflect a traveling condition of the vehicle before the current moment. Therefore, the calculation accuracy of the initial average energy consumption of the electric vehicle at the current moment is effectively improved.

TABLE 1

| $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | $a_{14}$ | $a_{15}$ |
|---|---|---|---|---|---|---|---|---|---|---|---|---|---|---|
| 1.32 | 1.29 | 1.26 | 1.23 | 1.21 | 1.19 | 1.17 | 1.15 | 1.12 | 1.1 | 1.08 | 1.06 | 1.03 | 1.01 | 1 |

| $a_{16}$ | $a_{17}$ | $a_{18}$ | $a_{19}$ | $a_{20}$ | $a_{21}$ | $a_{22}$ | $a_{23}$ | $a_{24}$ | $a_{25}$ | $a_{26}$ | $a_{27}$ | $a_{28}$ | $a_{29}$ | $a_{30}$ |
|---|---|---|---|---|---|---|---|---|---|---|---|---|---|---|
| 0.98 | 0.95 | 0.94 | 0.92 | 0.9 | 0.89 | 0.86 | 0.85 | 0.84 | 0.81 | 0.8 | 0.78 | 0.77 | 0.75 | 0.74 |

In an embodiment, the actual average energy consumption of the electric vehicle at the current moment is determined based on the initial average energy consumption, the target average energy consumption and the average energy consumption adjustment parameter, by the following operations.

The initial average energy consumption is adjusted based on the average energy consumption adjustment parameter, and the adjusted initial average energy consumption is determined as the actual average energy consumption of the electric vehicle at the current moment, in the case that an absolute value of a difference between the initial average energy consumption and the target average energy consumption is greater than or equal to a first threshold. The target average energy consumption is determined as the actual average energy consumption of the electric vehicle at the current moment, in the case that the absolute value of the difference between the initial average energy consumption and the target average energy consumption is smaller than the first threshold.

The initial average energy consumption is adjusted based on the average energy consumption adjustment parameter by the following operations.

The difference between the initial average energy consumption and the average energy consumption adjustment parameter is determined as the adjusted initial average energy consumption, in the case that the initial average energy consumption is greater than the target average energy consumption. A sum of the initial average energy consumption and the average energy consumption adjustment parameter is determined as the adjusted initial average energy consumption, in the case that the initial average energy consumption is not greater than the target average energy consumption.

In an embodiment, the average energy consumption adjustment parameter is set to 0.01 kwh/km, which is determined as the first threshold. That is, the initial average energy consumption minus 0.01 kwh/km is determined as the actual average energy consumption of the electric vehicle at the current moment, in the case that the initial average energy consumption is greater than the target average energy consumption and the difference between the initial average energy consumption and the target average energy consumption is greater than 0.01 kwh/km. The initial average energy consumption plus 0.01 kwh/km is determined as the actual average energy consumption of the electric vehicle at the current moment, in the case that the initial average energy consumption is smaller than the target average energy consumption and the difference between the initial average energy consumption and the target average energy consumption is greater than 0.01 kwh/km. The target average energy consumption is determined as the actual average energy consumption of the electric vehicle at the current moment, in the case that the absolute value of the difference between the initial average energy consumption and the target average energy consumption is smaller than 0.01 kwh/km. In this way, if the absolute value of the difference between the calculated initial average energy consumption and the target average energy consumption is too large, such as greater than 0.01 kwh/km, the initial average energy consumption is considered to be calculated inaccurately. Then, the initial average energy consumption is adjusted based on the average energy consumption adjustment parameter, and the adjusted initial average energy consumption is determined as the actual average energy consumption at the current moment to be output.

In an embodiment, after the actual average energy consumption at the current moment is obtained, whether the actual average energy consumption at the current moment exceeds a preset limit value needs further to be determined. The actual average energy consumption at the current moment is compared with a preset energy consumption upper limit value and a preset energy consumption lower limit value, respectively. For example, assuming that the actual average energy consumption at the current moment is 0.06 kwh/km, the preset energy consumption upper limit value is 0.05 kwh/km, and the preset energy consumption lower limit value is 0.02 kwh/km, 0.05 kwh/km is determined as the actual average energy consumption at the current moment to be output. It can be understood that, if the actual average energy consumption at the current moment is 0.01 kwh/km, 0.02 kwh/km is determined as the actual average energy consumption at the current moment to be output. The actual average energy consumption at the current moment is multiplied by 100 to obtain energy consumption per 100 kilometers at the current moment, and the obtained energy consumption per 100 kilometers is output and displayed to show the driver the current energy consumption per 100 kilometers of the vehicle in real time. At the same time, in order to avoid an impact of charging on the calculation, if it is detected that the vehicle is in a charging state at the current moment, the actual average energy consumption at a previous moment is determined as the actual average energy consumption at the current moment to be output.

In order to further ensure the calculation accuracy of the actual average energy consumption, after the actual average energy consumption of the electric vehicle at the current moment is determined based on the initial average energy consumption, the target average energy consumption and the average energy consumption adjustment parameter in this embodiment, the method further includes the following operations.

Remaining energy of the battery pack is acquired. First energy corresponding to current unit energy consumption of the battery pack is determined based on the initial average energy consumption, the target average energy consumption, the average energy consumption adjustment parameter and the remaining energy. Second energy corresponding to target unit energy consumption of the battery pack is determined based on the target average energy consumption and the remaining energy. Initial average energy consumption of the electric vehicle at a next moment is determined based on the first energy and the second energy. The remaining energy of the battery pack, that is, a current SOC of the battery pack, may be directly acquired through a battery management system (BMS) of the electric vehicle. The accuracy of the actual average energy consumption at the current moment is further verified based on the energy corresponding to the current unit energy consumption of the battery pack and the energy corresponding to the target energy consumption of the battery pack, and the initial average energy consumption at the next moment is adjusted based on a verification result. In this way, a calculation result can be corrected effectively and the calculation accuracy of the actual average energy consumption can be improved. The energy corresponding to the current unit energy consumption of the battery pack is energy consumption corresponding to a current unit SOC of the battery pack. The energy corresponding to the target energy consumption of the battery pack is energy consumption corresponding to a theoretical unit SOC of the battery pack.

The first energy corresponding to the current unit energy consumption of the battery pack is determined based on the initial average energy consumption, the target average energy consumption, the average energy consumption adjustment parameter and the remaining energy by the following operation. Consumed energy of the battery pack is determined based on the remaining energy; an energy consumption difference between the initial average energy consumption and the target average energy consumption is determined; and the first energy corresponding to the current unit energy consumption of the battery pack is determined based on a ratio of the consumed energy to a sum of the energy consumption difference and the average energy consumption adjustment parameter. The first energy represents an SOC corresponding to unit energy consumption in the consumed energy at the current moment. The first energy is calculated from an equation: first energy=(100−current SOC value)/((initial average energy consumption-target average energy consumption)+average energy consumption adjustment parameter). It can be understood that, if the current SOC of the battery pack is 60%, the current SOC value of the battery pack is 60. Since the consumed SOC value is different from the current remaining SOC value, in order to ensure the calculation accuracy and avoid an excessive calculation error, the average energy consumption adjustment parameter is used as the adjustment parameter to adjust the calculation result of the first energy, so as to avoid an excessive difference between the first energy and the second energy.

As one example, the second energy corresponding to the target unit energy consumption of the battery pack is determined based on the target average energy consumption and the remaining energy by the following operation. The second energy corresponding to the target unit energy consumption of the battery pack is determined based on a ratio of the remaining energy to the target average energy consumption. The second energy is calculated from an equation: second energy=current SOC value/target average energy consumption. The second energy represents an SOC corresponding to one unit energy consumption in the remaining energy of the battery pack at the current moment.

As one example, the initial average energy consumption of the electric vehicle at a next moment is determined based on the first energy and the second energy by the following operation. The actual average energy consumption of the electric vehicle at the current moment is determined as the initial average energy consumption of the electric vehicle at the next moment, in the case that an absolute value of a difference between the first energy and the second energy is larger than or equal to a second threshold. In this embodiment, the second threshold is set to 0. That is, the actual average energy consumption of the electric vehicle at the current moment is determined as the initial average energy consumption of the electric vehicle at the next moment, when the first energy is equal to the second energy. The absolute value of the difference between the first energy and the second energy larger than or equal to the second threshold means that the actual average energy consumption is required to be further adjusted. Thus, the actual average energy consumption at the current moment is determined as the initial average energy consumption of the electric vehicle at the next moment, and the actual average energy consumption of the electric vehicle at the next moment is determined based on the initial average energy consumption, the target average energy consumption and the average energy consumption adjustment parameter, so as to adjust the actual average energy consumption at the next moment. If the absolute value of the difference between the first energy and the second energy is smaller than the second threshold, the initial average energy consumption at the next moment is determined based on re-determined 30 unit mileage segments, and the actual average energy consumption at the next moment is re-calculated based on the above process.

Figure 3:
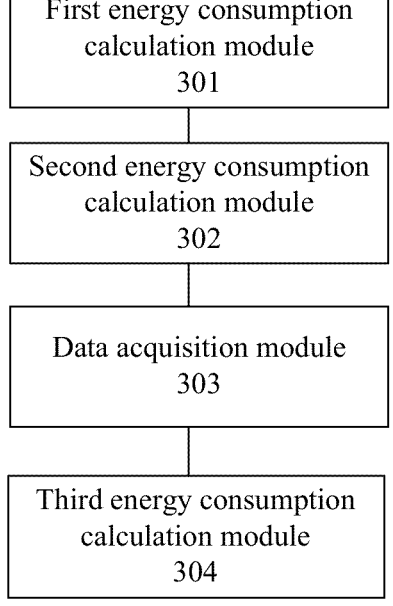
FIG. 3 is a schematic block diagram of an apparatus for predicting average energy consumption of an electric vehicle according to a preferred embodiment of the present disclosure.

As shown in FIG. 3, an apparatus for predicting average energy consumption of an electric vehicle is further provided according to an embodiment of the present disclosure. The apparatus includes a first energy consumption calculation module 301, a second energy consumption calculation module 302, a data acquisition module 303, and a third energy consumption calculation module 304.

The first energy consumption calculation module 301 is configured to determine actual energy consumption of a traveled mileage segment of the electric vehicle at a current moment based on a real-time voltage and a real-time current of a battery pack of the electric vehicle, where the traveled mileage segment includes multiple unit mileage segments.

The second energy consumption calculation module 302 is configured to determine initial average energy consumption of the electric vehicle at the current moment based on actual energy consumption values of the unit mileage segments of the traveled mileage segment.

The data acquisition module 303 is configured to acquire target average energy consumption and an average energy consumption adjustment parameter of the electric vehicle.

The third energy consumption calculation module 304 is configured to determine actual average energy consumption of the electric vehicle at the current moment based on the initial average energy consumption, the target average energy consumption and the average energy consumption adjustment parameter.

To sum up, with this embodiment, the actual average energy consumption of the electric vehicle can be calculated more accurately and in real time. By calculating the initial average energy consumption of the vehicle based on the current voltage and current of the battery pack in real time, the calculation error of energy consumption can be effectively reduced, so that the current energy consumption can be calculated more accurately and displayed to the user, providing a more reliable guarantee for the user to travel.

It should be appreciated by those skilled in the art that, functional modules in the examples described according to the embodiments disclosed herein may be implemented as electronic hardware. The modules are merely divided based on a logical function. There may be other division ways in practical application. In addition, functional modules in the embodiments of the present disclosure may be integrated into one processing device, or each of the modules may exist alone physically, or two or more modules are integrated into one device.

Furthermore, a device for predicting average energy consumption of an electric vehicle is further provided according to an embodiment of the present disclosure. The device includes a processor, a communication interface, a memory, and a communication bus.

The processor, the communication interface, and the memory implement mutual communication through the communication bus; and the communication interface is an interface of a communication module.

The memory is configured to store program codes and transmit the program codes to the processor.

The processor is configured to invoke instructions of the program codes in the memory to perform the method for predicting the average energy consumption of the electric vehicle according to the embodiments of the present disclosure.

Furthermore, a vehicle is provided according to an embodiment of the present disclosure. The vehicle includes: the apparatus for predicting the average energy consumption of the electric vehicle as shown in FIG. 3; or the above device for predicting the average energy consumption of the electric vehicle.

Furthermore, a storage medium is further provided according to an embodiment of the present disclosure. The storage medium is configured to store a computer program. The computer program is configured to perform the method according to the embodiments of the present disclosure.

Furthermore, a computer program product including instructions is further provided according to an embodiment of the present disclosure. The instructions, when run on a computer, cause the computer to perform the method according to the embodiments of the present disclosure.

Optional embodiments of the present disclosure are described in detail above in conjunction with the drawings. However, the embodiments of the present disclosure are not limited to the details in the above embodiments. Various simple variants can be made to the technical solution according to the embodiments of the present disclosure within the scope of the technical concept of the embodiments of the present disclosure, and these simple variants all fall within the protection scope of the embodiments of the present disclosure.

In addition, it should be noted that various technical features described in the above embodiments may be combined in any appropriate manner if there is no contradiction. In order to avoid unnecessary repetition, various possible combinations are not described in the embodiments of the present disclosure.

Furthermore, various embodiments of the present disclosure may be combined arbitrarily as long as the idea of the embodiments of the present disclosure is not violated, and these combinations should be regarded as the contents disclosed in the embodiments of the present disclosure.

It should be understood by those skilled in the art that the embodiments of the present disclosure may be implemented as a method, a system or a computer program product. Therefore, the present disclosure may be implemented by only hardware embodiments, only software embodiments or embodiments combining software with hardware. In addition, the present disclosure may be implemented in a form of one or more computer program products that are implemented in a computer usable storage medium (including but not limited to a disk memory, a CD-ROM, an optical memory and the like) storing a computer usable program code.

The present disclosure is described with reference to flowcharts and/or block diagrams of the method, the device (the system), and the computer program product in the embodiments of the present disclosure. It should be understood that each flow and/or block of the flowcharts and/or block diagrams and a combination of flows and/or blocks in the flowcharts and/or block diagrams may be implemented by computer program instructions. The computer program instructions may be installed in a general-purpose computer, a dedicated computer, an embedded processor or processors of other programmable data processing devices to generate a machine, such that the instructions executed by the computer or the processors of the other programmable data processing devices generate an apparatus for implementing functions specified in one or more flows of the flowcharts and/or one or more blocks of the block diagrams.

The computer program instructions may also be stored in a computer readable memory which can guide the computer or other programmable data processing devices to operate in a certain manner, such that the instructions stored in the computer readable memory generate a product including an instruction apparatus which implements functions specified in one or more flows of the flowcharts and/or one or more blocks of the block diagrams.

The computer program instructions may also be loaded to a computer or other programmable data processing devices, such that the computer or other programmable devices performs a series of operation steps to generate processing implemented by the computer, and thus the instructions performed by the computer or other programmable devices provide steps for implementing functions specified in one or more flows of the flowcharts and/or one or more blocks of the block diagrams.

In a typical configuration, a computing device includes one or more processors (CPU), an input/output interface, a network interface and a memory.

The memory may include a non-permanent memory, a random access memory (RAM), and/or a non-volatile memory in the computer readable medium, such as a read-only memory (ROM) or a flash RAM. The memory is an example of the computer readable medium.

The computer readable medium includes a permanent medium and a non-permanent medium, and a removable medium and a non-removable medium, and information storage may be performed by any method or technology. The information may be a computer readable instruction, a data structure, a program module or other data. The computer storage medium includes, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read only memory (CD-ROM), a digital versatile disk (DVD) or other optical memories, a magnetic cassettes, a magnetic tape and magnetic disk storage, other magnetic storage devices, or any other non-transmission medium capable of storing information that can be accessed by a computing device. According to the definition of the present disclosure, the computer readable medium does not include transitory media, such as a modulated data signal and a carrier.

It should further be noted that, terms "include", "comprise" or any other variants thereof are intended to be non-exclusive. Therefore, a process, method, article or device including multiple elements includes not only the elements but also other elements that are not enumerated, or further includes the elements inherent for the process, method, article or device. Unless expressively limited otherwise, an element defined by the statement "comprising a . . . " does not exclude a case that additional similar elements are included in the process, method, article or device including the element.

The above are only embodiments of the present disclosure and are not intended to limit the present disclosure. For those skilled in the art, various modifications and variations may be made to the present disclosure. Any modifications, equivalent substitutions or improvements made within the spirit and principle of the present disclosure should fall within the scope of claims of the present disclosure.

What we claim is:

1. A method for predicting average energy consumption of an electric vehicle, comprising:

acquiring a real-time voltage and a real-time current of a battery pack of the electric vehicle in real time when the electric vehicle is traveling;

determining actual energy consumption of a traveled mileage segment of the electric vehicle at a current moment based on the real-time voltage and the real-time current, wherein the traveled mileage segment comprises a plurality of unit mileage segments before the current moment;

determining initial average energy consumption of the electric vehicle at the current moment based on actual energy consumption values of the unit mileage segments of the traveled mileage segment;

acquiring target average energy consumption and an average energy consumption adjustment parameter of the electric vehicle, wherein the target average energy consumption is obtained by: acquiring total energy of the battery pack and maximum mileage corresponding to the battery pack; and determining the target average energy consumption based on a ratio of the total energy to the maximum mileage;

determining actual average energy consumption of the electric vehicle at the current moment based on the initial average energy consumption, the target average energy consumption and the average energy consumption adjustment parameter;

outputting a current energy consumption to a user in the electric vehicle based on the actual average energy consumption; and wherein the determining actual average energy consumption of the electric vehicle at the current moment based on the initial average energy consumption, the target average energy consumption and the average energy consumption adjustment parameter comprises:

adjusting the initial average energy consumption based on the average energy consumption adjustment parameter and determining the adjusted initial average energy consumption as the actual average energy consumption of the electric vehicle at the current moment, in a case that an absolute value of a difference between the initial average energy consumption and the target average energy consumption is greater than or equal to a first threshold; and determining the target average energy consumption as the actual average energy consumption of the electric vehicle at the current moment, in a case that the absolute value of the difference between the initial average energy consumption and the target average energy consumption is smaller than the first threshold.

2. The method for predicting the average energy consumption of the electric vehicle according to claim 1, wherein the determining initial average energy consumption of the electric vehicle at the current moment based on actual energy consumption values of the unit mileage segments of the traveled mileage segment comprises:

acquiring weights corresponding to the actual energy consumption values of the unit mileage segments; and performing weighted average on the actual energy consumption values of the unit mileage segments based on the weights corresponding to the actual energy consumption values of the unit mileage segments, and determining a result of the weighted average as the initial average energy consumption of the electric vehicle at the current moment, wherein the weights corresponding to the actual energy consumption values of the unit mileage segments decrease as distances between the unit mileage segments and mileage of the electric vehicle at the current moment decreases.

3. The method for predicting the average energy consumption of the electric vehicle according to claim 1, wherein the adjusting the initial average energy consumption based on the average energy consumption adjustment parameter comprises:

determining a difference between the initial average energy consumption and the average energy consumption adjustment parameter as the adjusted initial average energy consumption, in a case that the initial average energy consumption is greater than the target average energy consumption; and determining a sum of the initial average energy consumption and the average energy consumption adjustment parameter as the adjusted initial average energy consumption, in a case that the initial average energy consumption is not greater than the target average energy consumption.

4. The method for predicting the average energy consumption of the electric vehicle according to claim 1, wherein the target average energy consumption is determined by:

acquiring total energy of the battery pack and maximum mileage corresponding to the battery pack; and determining the target average energy consumption based on a ratio of the total energy to the maximum mileage.

5. The method for predicting the average energy consumption of the electric vehicle according to claim 1, wherein after the determining actual average energy consumption of the electric vehicle at the current moment based on the initial average energy consumption, the target average energy consumption and the average energy consumption adjustment parameter, the method further comprises:

acquiring remaining energy of the battery pack;

determining first energy corresponding to current unit energy consumption of the battery pack based on the initial average energy consumption, the target average energy consumption, the average energy consumption adjustment parameter and the remaining energy; and determining second energy corresponding to target unit energy consumption of the battery pack based on the target average energy consumption and the remaining energy; and determining initial average energy consumption of the electric vehicle at a next moment based on the first energy and the second energy.

6. The method for predicting the average energy consumption of the electric vehicle according to claim 5, wherein the determining initial average energy consumption of the electric vehicle at a next moment based on the first energy and the second energy comprises:

determining the actual average energy consumption of the electric vehicle at the current moment as the initial average energy consumption of the electric vehicle at the next moment, in a case that an absolute value of a difference between the first energy and the second energy is greater than or equal to a second threshold.

7. The method for predicting the average energy consumption of the electric vehicle according to claim 5, wherein the determining first energy corresponding to current unit energy consumption of the battery pack based on the initial average energy consumption, the target average energy consumption, the average energy consumption adjustment parameter and the remaining energy comprises:

determining consumed energy of the battery pack based on the remaining energy;

determining an energy consumption difference between the initial average energy consumption and the target average energy consumption; and determining the first energy corresponding to the current unit energy consumption of the battery pack, based on a ratio of the consumed energy to a sum of the energy consumption difference and the average energy consumption adjustment parameter.

8. The method for predicting the average energy consumption of the electric vehicle according to claim 5, wherein the determining second energy corresponding to target unit energy consumption of the battery pack based on the target average energy consumption and the remaining energy comprises:

determining the second energy corresponding to the target unit energy consumption of the battery pack based on a ratio of the remaining energy to the target average energy consumption.

9. A device for predicting average energy consumption of an electric vehicle, comprising a processor, a communication interface, a memory, and a communication bus, wherein the processor, the communication interface, and the memory communicate through the communication bus; and the communication interface is an interface of a communication module;

the memory is configured to store program codes and transmit the program codes to the processor; and the processor is configured to invoke instructions of the program codes in the memory to:

acquire a real-time voltage and a real-time current of a battery pack of the electric vehicle in real time when the electric vehicle is traveling;

determine actual energy consumption of a traveled mileage segment of the electric vehicle at a current moment based on the real-time voltage and the real-time current, wherein the traveled mileage segment comprises a plurality of unit mileage segments before the current moment;

determine initial average energy consumption of the electric vehicle at the current moment based on actual energy consumption values of the unit mileage segments of the traveled mileage segment;

acquire target average energy consumption and an average energy consumption adjustment parameter of the electric vehicle, wherein the target average energy consumption is obtained by: acquiring total energy of the battery pack and maximum mileage corresponding to the battery pack; and determining the target average energy consumption based on a ratio of the total energy to the maximum mileage;

determine actual average energy consumption of the electric vehicle at the current moment based on the initial average energy consumption, the target average energy consumption and the average energy consumption adjustment parameter;

output a current energy consumption to a user in the electric vehicle based on the actual average energy consumption; and wherein the processor is configured to invoke the instructions of the program codes in the memory to:

adjust the initial average energy consumption based on the average energy consumption adjustment parameter and determine the adjusted initial average energy consumption as the actual average energy consumption of the electric vehicle at the current moment, in a case that an absolute value of a difference between the initial average energy consumption and the target average energy consumption is greater than or equal to a first threshold; and determine the target average energy consumption as the actual average energy consumption of the electric vehicle at the current moment, in a case that the absolute value of the difference between the initial average energy consumption and the target average energy consumption is smaller than the first threshold.

10. The device for predicting the average energy consumption of the electric vehicle according to claim 9, wherein the processor is configured to invoke the instructions of the program codes in the memory to:

acquire weights corresponding to the actual energy consumption values of the unit mileage segments; and perform weighted average on the actual energy consumption values of the unit mileage segments based on the weights corresponding to the actual energy consumption values of the unit mileage segments, and determine a result of the weighted average as the initial average energy consumption of the electric vehicle at the current moment, wherein the weights corresponding to the actual energy consumption values of the unit mileage segments decrease as distances between the unit mileage segments and mileage of the electric vehicle at the current moment decreases.

11. The device for predicting the average energy consumption of the electric vehicle according to claim 9, wherein the processor is configured to invoke the instructions of the program codes in the memory to:

determine a difference between the initial average energy consumption and the average energy consumption adjustment parameter as the adjusted initial average energy consumption, in a case that the initial average energy consumption is greater than the target average energy consumption; and determine a sum of the initial average energy consumption and the average energy consumption adjustment parameter as the adjusted initial average energy consumption, in a case that the initial average energy consumption is not greater than the target average energy consumption.

12. The device for predicting the average energy consumption of the electric vehicle according to claim 9, wherein the target average energy consumption is determined by:

acquiring total energy of the battery pack and maximum mileage corresponding to the battery pack; and determining the target average energy consumption based on a ratio of the total energy to the maximum mileage.

13. The device for predicting the average energy consumption of the electric vehicle according to claim 9, wherein the processor is configured to invoke the instructions of the program codes in the memory to:

acquire remaining energy of the battery pack;

determine first energy corresponding to current unit energy consumption of the battery pack based on the initial average energy consumption, the target average energy consumption, the average energy consumption adjustment parameter and the remaining energy; and determine second energy corresponding to target unit energy consumption of the battery pack based on the target average energy consumption and the remaining energy; and determine initial average energy consumption of the electric vehicle at a next moment based on the first energy and the second energy.

14. The device for predicting the average energy consumption of the electric vehicle according to claim 13, wherein the processor is configured to invoke the instructions of the program codes in the memory to:

determine the actual average energy consumption of the electric vehicle at the current moment as the initial average energy consumption of the electric vehicle at the next moment, in a case that an absolute value of a difference between the first energy and the second energy is greater than or equal to a second threshold.

15. The device for predicting the average energy consumption of the electric vehicle according to claim 13, wherein the processor is configured to invoke the instructions of the program codes in the memory to:

determine consumed energy of the battery pack based on the remaining energy;

determine an energy consumption difference between the initial average energy consumption and the target average energy consumption; and determine the first energy corresponding to the current unit energy consumption of the battery pack, based on a ratio of the consumed energy to a sum of the energy consumption difference and the average energy consumption adjustment parameter.

16. The device for predicting the average energy consumption of the electric vehicle according to claim 13, wherein the processor is configured to invoke the instructions of the program codes in the memory to:

determine the second energy corresponding to the target unit energy consumption of the battery pack based on a ratio of the remaining energy to the target average energy consumption.

17. The device for predicting the average energy consumption of the electric vehicle according to claim 9, further comprising:

if it is detected that the electric vehicle is in a charging state at the current moment, determining the actual average energy consumption at a previous moment as the actual average energy consumption at the current moment to be output.

18. A vehicle, comprising:

the device for predicting the average energy consumption of the electric vehicle according to claim 9.

19. A non-transitory computer readable storage medium, configured to store a computer program, wherein the computer program, when being executed by a processor, causes the processor to:

acquire a real-time voltage and a real-time current of a battery pack of the electric vehicle in real time when the electric vehicle is traveling;

determine actual energy consumption of a traveled mileage segment of the electric vehicle at a current moment based on the real-time voltage and the real-time current, wherein the traveled mileage segment comprises a plurality of unit mileage segments before the current moment;

determine initial average energy consumption of the electric vehicle at the current moment based on actual energy consumption values of the unit mileage segments of the traveled mileage segment;

acquire target average energy consumption and an average energy consumption adjustment parameter of the electric vehicle, wherein the target average energy consumption is obtained by: acquiring total energy of the battery pack and maximum mileage corresponding to the battery pack; and determining the target average energy consumption based on a ratio of the total energy to the maximum mileage;

determine actual average energy consumption of the electric vehicle at the current moment based on the initial average energy consumption, the target average energy consumption and the average energy consumption adjustment parameter;

output a current energy consumption to a user in the electric vehicle based on the actual average energy consumption; and wherein the processor is configured to invoke the instructions of the program codes in the memory to:

adjust the initial average energy consumption based on the average energy consumption adjustment parameter and determine the adjusted initial average energy consumption as the actual average energy consumption of the electric vehicle at the current moment, in a case that an absolute value of a difference between the initial average energy consumption and the target average energy consumption is greater than or equal to a first threshold; and determine the target average energy consumption as the actual average energy consumption of the electric vehicle at the current moment, in a case that the absolute value of the difference between the initial average energy consumption and the target average energy consumption is smaller than the first threshold.

* * * * *